United States Patent
Kroos

(10) Patent No.: US 6,280,612 B1
(45) Date of Patent: Aug. 28, 2001

(54) REVOLVING SCREENING RACK, SUPPORTING FRAME FOR A REVOLVING SCREENING RACK AND A CONTROL SHACKLE OF A SCREENING ELEMENT

(75) Inventor: Hein Kroos, Rinteln (DE)

(73) Assignee: Nogerath Holding GmbH & Co., KG (DE)

(*) Notice: Subject to any disclaimer, the term of this patent is extended or adjusted under 35 U.S.C. 154(b) by 0 days.

(21) Appl. No.: 09/647,350

(22) PCT Filed: Mar. 22, 1999

(86) PCT No.: PCT/EP99/01871

§ 371 Date: Sep. 28, 2000

§ 102(e) Date: Sep. 28, 2000

(87) PCT Pub. No.: WO99/50510

PCT Pub. Date: Oct. 7, 1999

(30) Foreign Application Priority Data

Mar. 30, 1998 (DE) ............................... 198 14 140

(51) Int. Cl.[7] ............................. E02B 5/08; B01D 33/04; E03F 5/14
(52) U.S. Cl. ..................... 210/158; 210/160; 210/357; 210/400
(58) Field of Search .................... 210/159, 160, 210/158, 400, 357

(56) References Cited

U.S. PATENT DOCUMENTS

| | | |
|---|---|---|
| 1,207,376 | * 12/1916 | Davidson . |
| 3,615,022 | * 10/1971 | Hagihara . |
| 3,856,678 | * 12/1974 | Hagihara . |
| 4,188,294 | * 2/1980 | Hagihara . |
| 4,323,451 | * 4/1982 | Hagihara . |
| 4,597,864 | * 7/1986 | Wiesemann . |
| 5,387,336 | * 2/1995 | Bormet et al. . |
| 5,387,337 | * 2/1995 | Byers . |
| 5,618,415 | * 4/1997 | Johnson, Jr. . |

FOREIGN PATENT DOCUMENTS

| | | |
|---|---|---|
| 2401956 | 7/1975 | (DE) . |
| 8901245.3 | 8/1990 | (DE) . |
| 4137710 | 5/1993 | (DE) . |
| 4215931 | * 11/1993 | (DE) . |
| 0542191 | 5/1993 | (EP) . |
| 578559 | * 1/1994 | (EP) . |
| 91/13671 | 9/1991 | (WO) . |
| 93/22513 | 11/1993 | (WO) . |

* cited by examiner

Primary Examiner—Thomas M. Lithgow
(74) Attorney, Agent, or Firm—Ostrolenk, Faber, Gerb & Soffen, LLP

(57) ABSTRACT

The invention relates to a revolving screening rack with a driveable endless screening belt formed by a plurality of screening elements which in each case have a plurality of elongate plates arranged parallel to and at a distance from one another, a bar-shaped connecting element engaging in each case through the plates at their two ends, said connecting element pivotably connecting the plates, engaging one into the other at least in regions, of two screening elements to one another in the manner of a link chain, with a pivotably mounted rack hook element which is capable of being pivotably displaced, at least partially, between two plates located next to one another, and with a steering lever for the rack hook element, said steering lever being pivotably articulated at one end on the rack hook element, said revolving screening rack being distinguished in that the other end (20) of the steering lever (17) is pivotably mounted on the screening belt (2).

27 Claims, 6 Drawing Sheets

Figure 1:
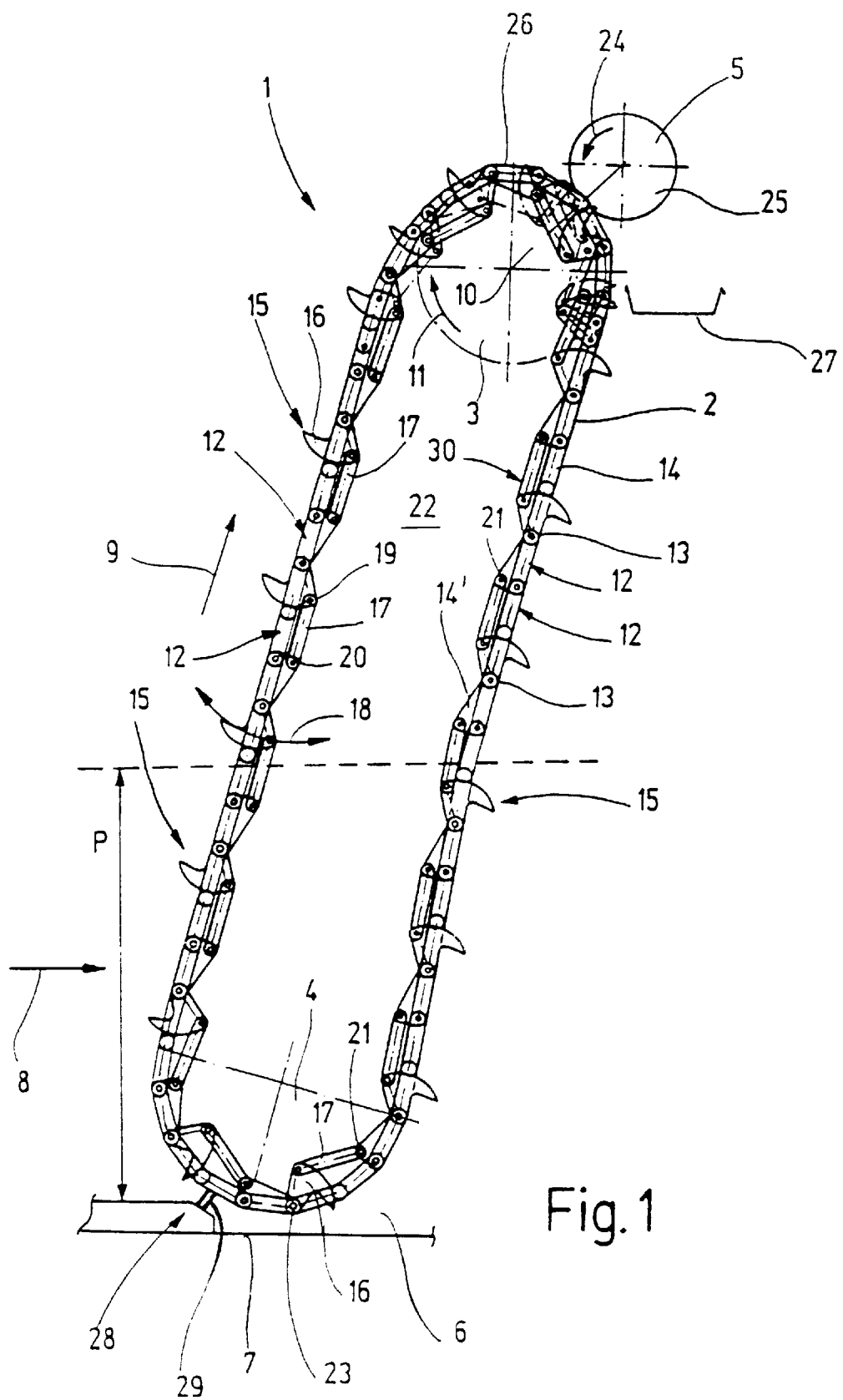

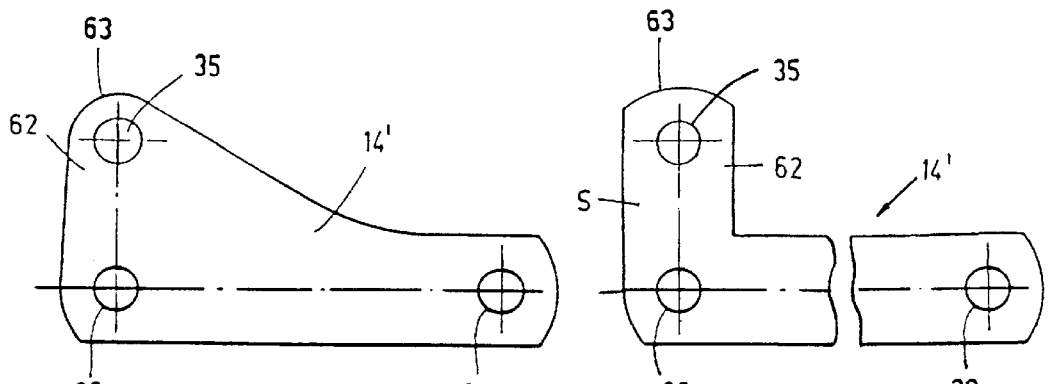
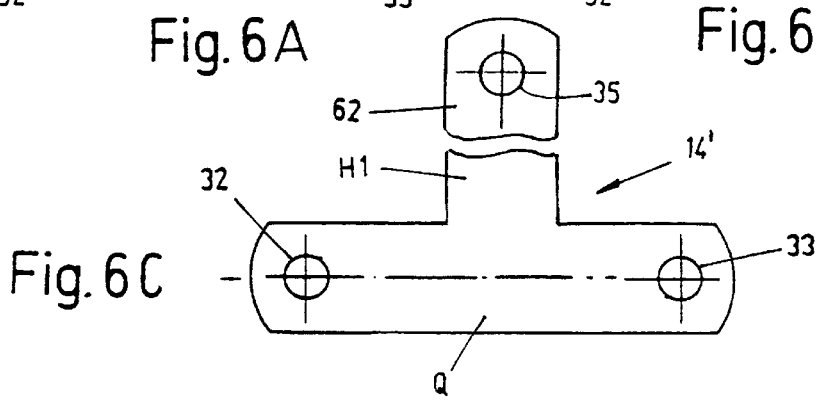
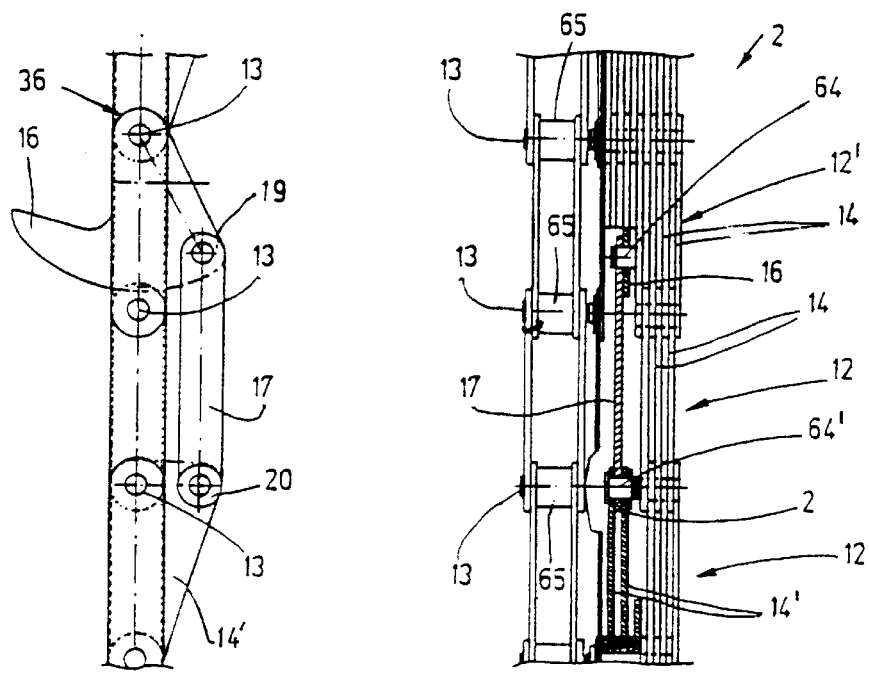

REVOLVING SCREENING RACK, SUPPORTING FRAME FOR A REVOLVING SCREENING RACK AND A CONTROL SHACKLE OF A SCREENING ELEMENT

NEW DESCRIPTION

The invention relates to a revolving screening rack with a driveable endless screening belt, according to the preamble of claim 1.

A revolving screening rack of the type referred to here is known from German utility model 89 01 245 U1. This revolving screening rack is produced in the manner of a closed link chain, the individual links serving as screening elements of a screening belt and being supplemented by a plurality of rack hook elements. These rack hook elements are capable of being moved in such a way that in each case a rack hook element can be displaced through between two plates of a screening element, hence engages through the screening element. That is to say, the rack hook element is designed to be capable of being moved in and out. At the same time, the rack hook element is activated via a steering lever which is pivotably articulated at one end on the rack hook element. The other end of this steering lever is guided in a guide track which lies within the space enclosed by the revolving screening rack. In this case, the guide track is selected in such a way that the rack hook elements are drawn in at a point on the revolving screening rack at which a cleaning brush engages on the screening rack.

One disadvantage of this known screening rack is that the guide track has to be adapted to different conveying heights of the revolving screening rack. Furthermore, when the revolving screening rack is tensioned between two deflecting devices, problems arise, since, here too, the guide track has to be adapted when the deflecting devices are moved away from one another.

WO 91/13671 discloses a revolving screening rack, in which the rack hook elements are arranged on the screening rack so as to be capable of being moved in and out. The rack elements are in each case activated via a steering lever which is guided at one end in a guide track. The revolving screening rack has a telescopically extendable supporting frame, to which deflecting devices for the screening belt are fastened. The telescopically extendable supporting frame is capable of being fixed in its respective extended position.

The object of the invention is, therefore, to specify a revolving screening rack which does not have these disadvantages.

The object is achieved by means of a revolving screening rack which has the features of claim 1. A revolving screening rack with a driveable endless screening belt is provided, the screening belt being formed by a plurality of screening elements. These screening elements in each case have a plurality of elongate plates which are arranged parallel to and at a distance from one another. In order to hold the plates at a desired distance from one another, spacer means may be used. A bar-shaped connecting element engages in each case through the plates of a screening element, so that the plates of two screening elements are connected to one another so as to be pivotable relative to one another in the manner of a link chain. Furthermore, the revolving screening rack has a pivotably mounted rack hook element which is capable of being pivotably displaced, at least partially, through between two plates located next to one another. The rack hook element is therefore capable of being moved out and in relative to the screening element. For this movement of the rack hook element, a steering lever is provided, which is pivotably articulated at one end on the rack hook element. According to the invention, the other end of the steering lever is pivotably mounted on the screening belt. It is consequently advantageously possible to move the rack hook element in and out relative to the screening element, in the region of a deflecting device of the revolving screening rack, merely by means of the selected kinematics, without a guide track being used. Consequently, cleaning of the screening belt can be carried out in the deflection region. It is advantageous, furthermore, that the so-called sill jump, when the revolving screening rack is arranged in a flume, can be selected low, so that there is a saving of material here and simple installation in the flume or channel is possible. Since there is no need for a guide track, it is possible in a simple way to tension the revolving screening rack between two deflecting devices, since the displaceability of the rack hook element in the deflection region is achieved by means of the screening belt itself. The revolving screening rack according to the invention is also distinguished in that the screening belt is driven directly, that is to say the screening belt also forms the driving chain. As a result, the number of wearing elements is reduced and a larger screening surface can be provided, which increases the effectiveness of the revolving screen rack according to the invention.

An exemplary embodiment of the revolving screening rack according to the invention is distinguished in that the steering lever is fastened so as to be pivotably mounted at its other end on a screening element of the screening belt which, as seen in the conveying direction of the screening belt, follows the screening element which has a rack hook element. Consequently, the steering lever and therefore also the rack hook element are actuated in the deflection region of the screening belt, in that the bearing points of the steering lever move toward one another, that is to say approach one another.

In a preferred embodiment, there is provision for the bar-shaped connecting element to engage through that end of the steering lever which is articulated on the screening belt. The steering lever bearing point located on the screening belt side is thus formed in a simple way. This bearing point therefore coincides with the pivot axis of two screening elements.

A particularly preferred exemplary embodiment is distinguished in that at least one plate, designed as a control shackle, of the screening element on which the steering lever is mounted is of essentially triangular form, a bar-shaped connecting element engaging in each case through two corner regions and the steering lever being arranged so as to be rotatably mounted on the third corner region. The bearing point of the steering lever is thus displaced out of the region of the screening belt. This ensures easy access to the steering lever, so that the latter can be exchanged in a simple way, for example in the event of damage. Alternatively, the control shackle may also be of T-shaped or L-shaped form. In the case of a T-shaped control shackle, a bar-shaped connecting element engages in each case through the two ends of the transverse web, the steering lever being arranged so as to be pivotably mounted on the free end of the horizontal web of the T. In the case of the L-shaped design of the control shackle, a bar-shaped connecting element in each case engages through the ends of the long leg of the L. The steering lever is then arranged so as to be pivotably mounted on the free end of the short leg of the L.

In the case of an L-shaped or T-shaped control shackle, therefore, the short leg of the L or the horizontal web of the T forms a prolongation. In the case of the triangular control shackle, the third corner region forms this prolongation. The prolongation has a bearing lug for the pivotable mounting of the steering lever, the prolongation extending transversely to the longitudinal extent of the control shackle.

In a preferred embodiment, there is provision for the rack hook element to be rotatably mounted on the bar-shaped connecting element. The pivot axis of the rack hook element thus coincides with the pivot axis of two screening elements.

There is therefore no need for any additional outlay in order to make it possible for the rack hook element to be movable.

A preferred exemplary embodiment is distinguished in that the rack hook element is of essentially L-shaped form. The rack hook element is pivotably mounted between the plates of a screening element on the free leg end of the L. The base of the L provides a rack prong which, during the pivoting movement of the rack hook element, emerges from the region of the screening belt or is drawn in in the deflection region of the screening belt, thus ensuring that the screening belt can be cleaned easily.

In the preferred embodiment, there is provision for the rack hook element to be pivotably connected to the steering lever in the transitional region between the leg and the base.

A preferred exemplary embodiment is distinguished in that the rack hook element has a first bearing lug, through which the bar-shaped connecting element passes. The pivot point of the rack hook element can thus be provided in a simple way.

In a preferred embodiment, there is provision for the rack hook element to have a second bearing lug, so that the rack hook element is capable of being fastened pivotally movably to the steering lever by means of a connecting piece. For this purpose, there may be provision for the connecting piece to be designed as a cylindrical bolt.

A particularly preferred exemplary embodiment is distinguished in that the two bearing lugs of the rack hook element each have an edge orifice. It is thereby possible, in a particularly simple way, to exchange a rack hook element, without the screening belt being dismantled even only partially.

In a particularly preferred embodiment, there is provision for the opening width of the edge orifice of the second bearing lug to be somewhat smaller than the diameter or the cross section of the connecting piece connecting the steering lever to the rack hook element. A snap connection is consequently made, which connects the rack hook element to the pivoting lever. This snap connection can be coupled and released in a simple way, so that there is no need for the screening belt to be demounted when a rack hook element is exchanged.

A particularly preferred exemplary embodiment is distinguished in that the first bearing lug has an opening width which is approximately equal to, preferably somewhat smaller than, the diameter or cross section of the bar-shaped connecting element. The rack hook element can thus be removed from its pivoting shaft in a simple way when this rack hook element is to be exchanged.

In a development of the invention, there is provision for the first bearing lug of the rack hook element to be capable of being closed in the region of its edge orifice by a closing means which is preferably adapted to the contour of the edge orifice. The rack hook element can thus be mounted in a simple way on the bar-shaped connecting element and be fixed by the closing means, so that the closing means serves as a securing element.

In a preferred exemplary embodiment, there is provision for at least one surface, delimiting the edge orifice, of the first bearing lug to have a latching device which cooperates with a counterlatching device on the closing means. The closing means can consequently be held securely in the edge orifice, with the result that the rack hook element is also securely held pivotably on the connecting element.

In a particularly preferred embodiment, there is provision for the latching and counterlatching devices to be formed in each case by a plurality of latching noses and latching depressions, the latching noses of the latching device engaging into the latching depressions of the counterlatching device, and vice versa. A securing device for the closing means is produced here, which makes it possible for the closing means to be held securely in the edge orifice, the latching and counterlatching devices engaging one into the other in a sawtooth-like manner.

In a preferred embodiment, the revolving screening rack has a plurality of rack hook elements, one of which is pivotably arranged in each case between two plates of a screening element, so that a row of rack hook elements with a plurality of rack prongs is produced. Preferably, at the same time, there is provision for at least one rack hook element to be driven via the steering lever. In this case, in a preferred embodiment, there is provision for the rack hook elements of a row of rack hook elements, which is also designated as a rack, to be connected rigidly to one another in order to synchronize their movement. The firm connection may be made by means of a connecting piece which is of bar-shaped design and engages through the rack hook elements of a row of rack hook elements.

A preferred exemplary embodiment of the revolving screening rack is distinguished in that a plurality of screening elements of the screening belt in each case have a row of rack hook elements, a bar-shaped connecting element engaging through the rack hook elements of a row of rack hook elements and forming the pivoting shaft of the row of rack hook elements or of the rack.

A preferred embodiment is distinguished in that the rigid connection for synchronizing the movement of the rack hook elements is provided in the transitional regions between the legs and the bases of the L-shaped rack hook elements. The rigid connection may be made, in particular, in that a continuous or bar-shaped connecting element engages through the second bearing lugs of the rack hook elements.

A particularly preferred exemplary embodiment is distinguished in that the leg forms with the base an angle which is smaller than 90°, the length of the leg being dimensioned in such a way that an imaginary perpendicular standing approximately centrally on the base intersects the leg end, in particular, in the region of the first bearing lug. The rack hook element is thus driven in such a way that, although the first and second bearing lugs lie on an imaginary line, this imaginary line does not coincide with the direction of longitudinal extent of the steering lever. This avoids the situation where the rack hook element is pivoted in a wrong direction.

In particular, the first bearing lug of the rack hook element is oriented in such a way that the edge orifice of the first bearing lug lies essentially in the direction of longitudinal extent of the leg, that is to say in the direction of the imaginary connecting line and so as to face away from the base. The edge orifice of the second bearing lug extends approximately at right angles to this imaginary connecting line, this edge orifice being located on the leg. This ensures, on the one hand, that the rack hook element can easily be connected to the bar-shaped connecting element of the screening elements and to the steering lever, but, on the other hand, that the rack hook element can easily be exchanged.

In an exemplary embodiment, the screening belt is guided via two deflecting devices which are arranged on a telescopically extendable supporting frame. The supporting frame is capable of being fixed in its respective extended position. By the use of the revolving screening rack according to the invention, in which a guide track may be dispensed with, it is therefore possible, in a particularly simple way, to tension the revolving screen rack by means of the telescopically extendable supporting frame. Moreover, it is possible in a simple way to vary the conveying height. For this purpose, at least one further screening element may be inserted into the revolving screening rack, and the revolving screening rack lengthened in this way can again be tensioned by means of the telescopically extendable supporting frame.

It is thus possible in a particularly simple way, by means of the supporting frame, to tension the revolving screening rack and adapt it to different conveying heights.

In a preferred embodiment, the supporting frame of the revolving screening rack has at least two subframes which are displaceably connected to one another, so that the above-mentioned telescopic lengthening of the supporting frame becomes possible. The profiles used for the subframes may, for example, be tubular profiles which can simply be plugged one into the other.

In a particularly preferred embodiment, the supporting frame of the revolving screening rack has a third subframe which is arranged between the first and the second subframe, at least the first subframe being displaceably connected to the third subframe. The third subframe may be provided in different lengths, so that a possibility for lengthening is afforded in addition to the telescopic lengthening of the supporting frame. A kind of modular system is thus provided here, in which the first and second subframes can be used for any conveying height and merely length adaption of the third subframe may be provided.

Further advantageous embodiments may be gathered from the subclaims.

Figure 2:
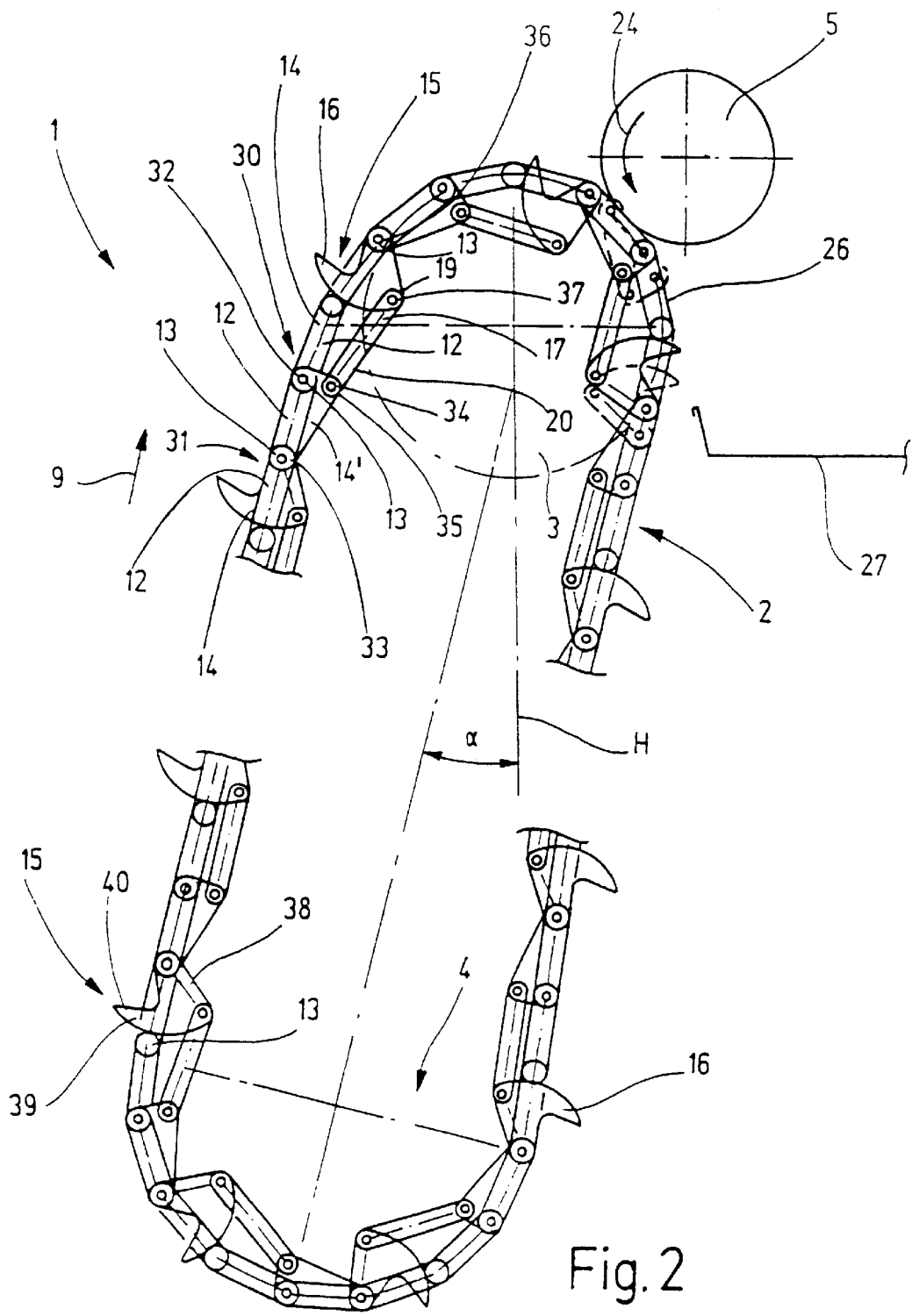
Figure 3:
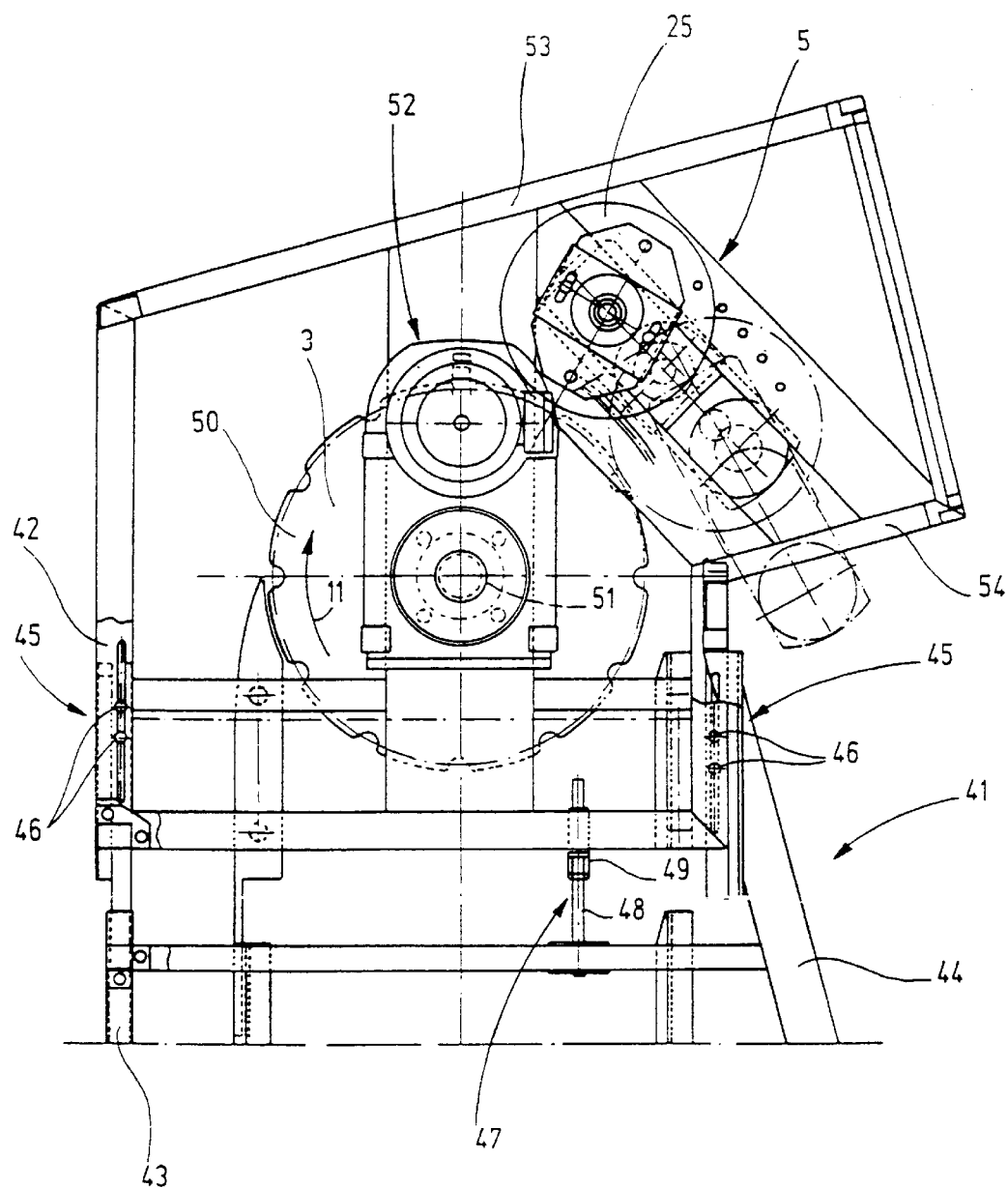
Figure 4:
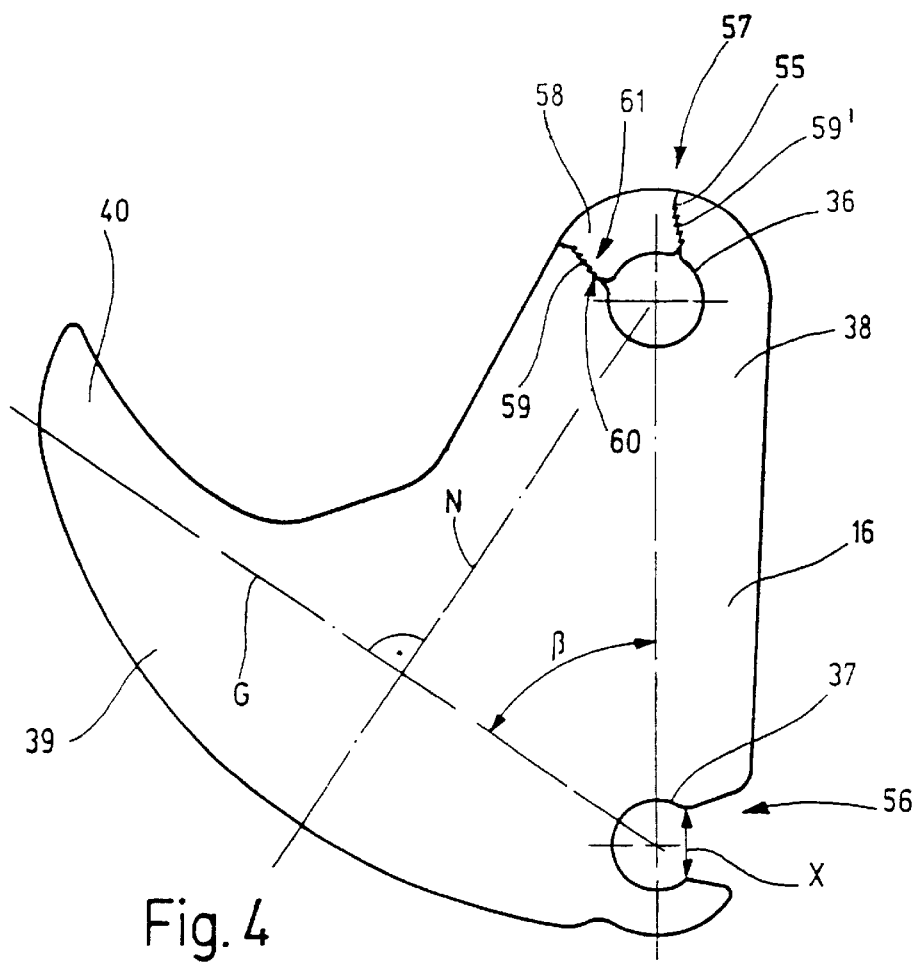
Figure 5:
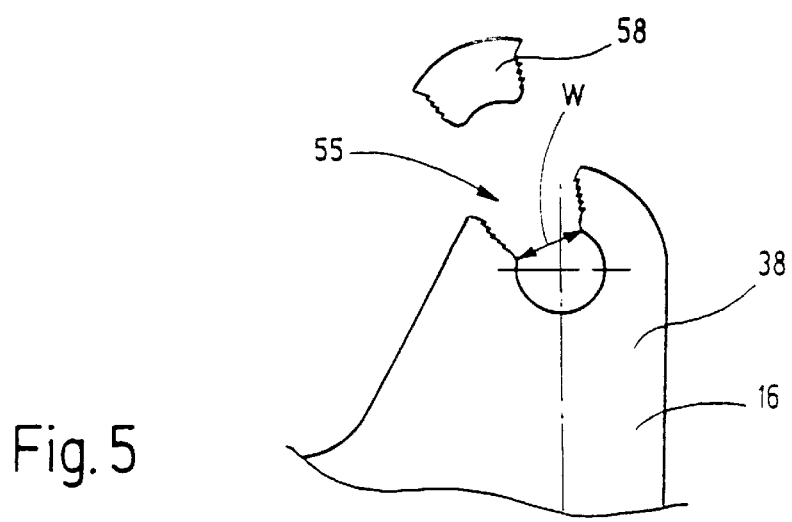
Figure 8:
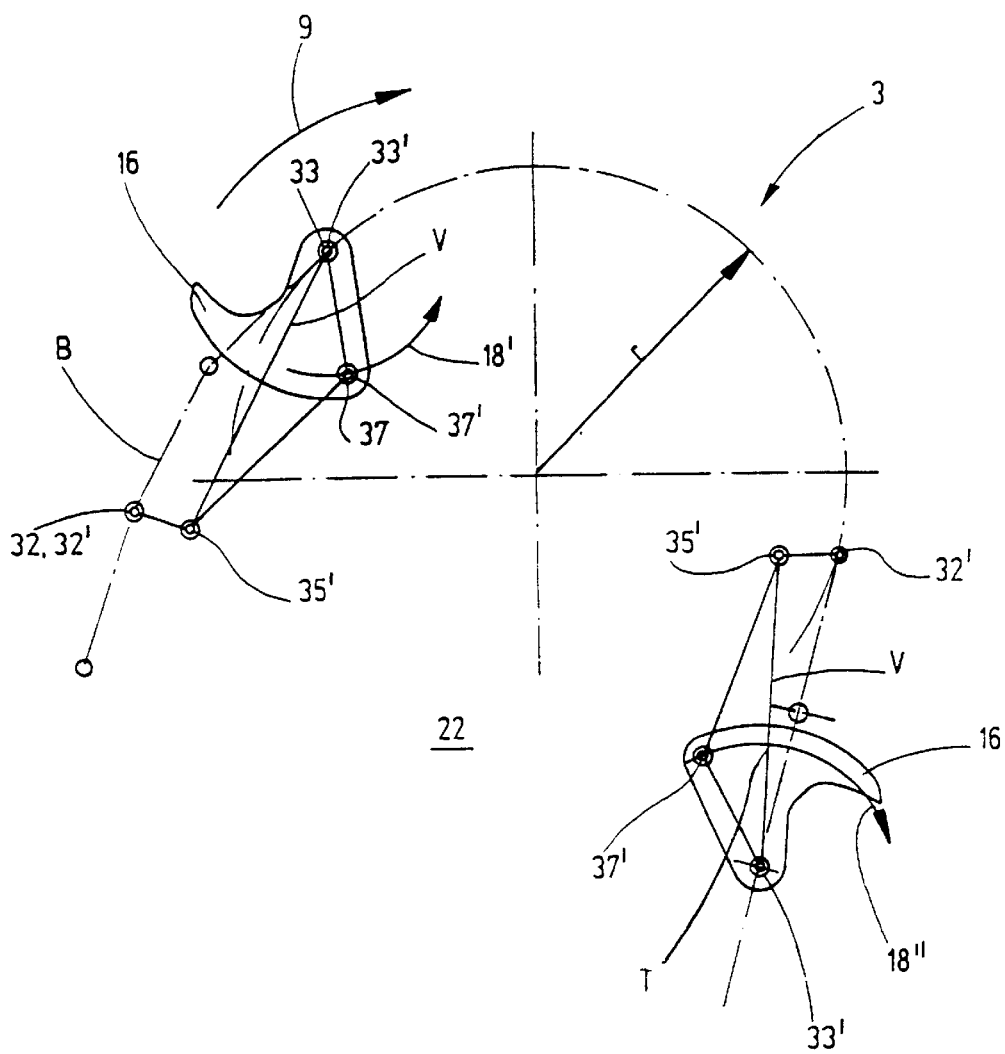

The invention is explained in more detail by means of exemplary embodiments with reference to the drawing, in which:

FIG. 1 shows a revolving screening rack,

FIG. 2 shows a detailed view of the revolving screening rack of FIG. 1 in the region of an upper and a lower deflecting device, FIG. 3 shows a detail of a supporting frame with an upper deflecting device for a revolving screening rack, FIG. 4 shows a rack hook element of a revolving screening rack with a closing means, FIG. 5 shows the rack hook element of FIG. 4 with the uncoupled closing means, FIGS. 6A to 6C show in each case an exemplary embodiment of a plate or control shackle of a screening element, FIGS. 7A and 7B show respectively a side view and top view of a detail of an exemplary embodiment of a screening belt, and FIG. 8 shows a basic illustration of a cycle of movement of a rack hook element in the region of a deflecting device.

Revolving screening racks of the type referred to here are used, in particular, for the mechanical precleaning of liquid media, in particular water, laden with solids. The revolving screening rack is arranged preferably in a flume or channel, in which the medium to be cleaned flows or is conveyed by pumping. The selected height of the revolving screening rack is greater than the depth of the flume or channel, so that the filtered-out solids can be conveyed out of the flume or the channel.

FIG. 1 shows a revolving screening rack 1, of which a driveable endless screening belt 2, an upper and lower deflecting device 3 and 4 and a cleaning element 5 for the screening belt 2 are illustrated, the upper and lower deflecting devices 3 and 4 and the cleaning element 5 being merely indicated.

The revolving screening rack 1 is arranged in a flume 6, a bottom 7 of which is reproduced only partially. A medium to be cleaned, in particular water, can flow or be conveyed in the direction of the arrow 8 in the flume 6. The height of the flume 6 or of the channel or the level P of the medium to be cleaned is lower than the height of the revolving screening rack 1.

So that solids filtered out by means of a screening belt 2 can be transported away from the flume 6, the screening belt 2 is driven in the conveying direction 9. For this purpose, there may be provision for the upper deflecting device 3 to be assigned a drive (not illustrated) which drives the upper deflecting device 3 about its axis of rotation 10 in the direction of the arrow 11.

The screening belt 2 comprises a plurality of screening elements 12 which are lined up with one another and are connected to one another, in each case via a bar-shaped connecting element 13, so as to be pivotable relative to one another, in the manner of an endless link chain. In each case a screening element 12 is formed by a plurality of elongate plates 14 arranged parallel to and at a distance from one another, the plates 14 of two screening elements 12 engaging one into the other at least in regions, so that the pivotable connection to the bar-shaped connecting element 13 is possible.

Some screening elements 12 are assigned in each case a row 15 of rack hook elements which comprises a plurality of rack hook elements 16. The rack hook elements 16, designated below merely as rack elements, are driven via a steering lever 17 in such a way that they are capable of being rotatably displaced, at least partially, through between two plates 14 located next to one another, as indicated by the double arrow 18. The steering lever 17 is pivotably articulated at one end 19 on a rack element 16 and is pivotably mounted at its other, second end 20 on the screening belt 2. There is provision, in particular, for the second end 20 of the steering lever 17 to be pivotably fastened to the screening element 12 which, as seen in the conveying direction 9 of the screening belt 2, follows the screening element 12 which has a rack element 16. For articulating the steering lever 17 on the screening belt 2, preferably a plate 14', also designated as a control shackle, of the following screening element 12 is provided with an articulation point 21 which projects out of the region of the remaining elongate plates 14 or projects into the region 22 enclosed by the screening belt 2. It is also possible, however, to mount the second end 20 of the steering lever 17 on a bar-shaped connecting element 13.

In the region of the deflecting devices 3 and 4, the distance between an articulation point 21 and a rack element 16 is shortened in the region of its pivotable connection to the steering lever 17. The rack element 16 is thereby pivoted about its pivot axis 23 into the region 22, specifically at most until the rack element 16 no longer projects outward from the screening belt 2. When this rack element 16 reemerges from the region of the deflecting device 3 or 4, the rack element 16 is displaced through between two plates 14 again, so that the row 15 of rack hook elements, which is designated below simply as a rack, is ready for receiving solids.

FIG. 1 also shows the cleaning element 5 which is assigned to the upper deflecting device 3 and is produced preferably as a cleaning brush 25 rotating in the direction of the arrow 24. The cleaning element 5 is arranged preferably in that region of the upper deflecting device 3 in which the rack elements 16 of a rack 15 do not essentially project beyond the screening belt 2. As a result, the entire screening surface 26 of the screening belt 2 can be cleaned by means of the cleaning brush 25. The filtered-out solids falling off from the screening surface 26 or stripped off by the cleaning element 5 can be delivered to a collecting container 27. The collecting container 27 is assigned to the revolving screening rack 1 approximately in the region of the upper deflecting device 3.

It is also possible, of course, to provide in the region 22, that is to say in the space enclosed by the screening belt 2, a cleaning element which may be designed in the same way as the cleaning element 5. Alternatively, it is also possible to provide a brush strip (not illustrated) which is capable of being applied, for example pivotably, to the inner face 30 of the screening belt 2. Alternatively or additionally, cleaning elements may also be provided, which have a nozzle-like design, so that the screening belt 2 can be cleaned by means of a medium jet, preferably water jet. Devices comprising sponges, stripping surfaces or cleaning combs engaging from inside or outside may, of course, also be provided.

On the bottom 7 of the flume 6, a so-called sill jump 28 is formed, which is designed with a relatively small height, since, as already mentioned, the racks 15 are retracted in the region of the lower deflecting device 4 and therefore do not come into contact with the bottom 7. In the region of the sill jump 28, there is also a sealing-off element 29 which may take the form of a brush, so that essentially no medium can pass, unfiltered, the revolving screening rack 1 or the screening belt 2.

FIG. 2 shows a detail of the revolving screening rack 1 of FIG. 1 in the region of the upper and lower deflecting devices 3 and 4. The same parts as in FIG. 1 are given the same reference symbols, and, to that extent, reference is made to the description of these.

It can be seen clearly in FIG. 2 that at least one plate 14', also designated as a control shackle, of a screening element 12 is of essentially triangular form. It is also possible, of course, for the plate 14' to have an L-shaped design. Two corner regions 30 and 31 of the plate 14', which are located one behind the other as seen in the conveying direction 9, have in each case a bearing lug 32 or 33, through which a bar-shaped connecting element 13 engages in each case. The plate 14' is thus pivotably connected, as seen in the conveying direction 9, to a plate 14 of a preceding and following screening element 12 of the screening belt 2.

Provided at the third corner region 34 of the plate 14' is a further, third bearing lug 35, on which the steering lever 17 is pivotably articulated at its second end 20. The steering lever 17, with its length, bridges a screening element 12 and is pivotably articulated at its other end 19 in a bearing lug 37 of the rack element 16 of a rack 15. Moreover, the rack hook element 16 has a first bearing lug 36, through which a bar-shaped connecting element 13 passes. This bar-shaped connecting element 13 thus forms the pivoting shaft for the rack element 16.

In order to form a rack 15, a screening element 12 has a plurality of rack hook elements 16 located one behind the other, so that the rack 15 extends into the image plane or drawing plane and a row of rack hook elements is produced. There is preferably provision for only one rack element 16 of the rack 15 to be driven via the steering lever 17. The remaining rack elements 16 of a rack 15 are connected preferably rigidly to the rack element 16 driven via the steering lever 17, so that these rack elements are positively taken up in order to synchronize the movement of the rack elements 16.

It can also be seen in FIG. 2 that the screening elements 12 are guided in rotation by the deflecting devices 3 and 4. In the region of the upper and lower deflecting devices 3 and 4, their circular contour causes the screening elements 12 to be pivoted relatively to one another. As a result, the articulation point 21 or the third bearing lug 35 of the plate 14' is moved toward the first bearing lug 36 of the rack element 16, so that the rack element 16 is pivoted inward into the region 22 about the bar-shaped connecting element 13. How far the rack element 16 is retracted into the screening belt 2 during rotation around the respective deflecting devices 3 and 4 depends on the diameter of the deflecting devices. Preferably, the deflecting devices 3 and 4 have a diameter such that the rack element 16 is retracted essentially completely when it runs over the deflecting devices 3 or 4. The deflecting devices 3 and 4 preferably take the form of two rotatably mounted chain wheels located at a distance from one another.

The rack element 16 preferably has a width or thickness such that essentially no gap is formed between two plates 14 assigned to the rack element 16. Solids to be filtered out therefore do not pass through the screening belt 2. Preferably, the plates 14 bear on the side faces of a rack element 16. When the rack element 16 is retracted, solids adhering to it are virtually wiped off and deposited on the screening surface 26. This ensures that the rack elements 16 are cleaned when they run over the deflecting devices 3 and 4. The screening surface 26 of the screening belt 2 can then be cleaned easily by means of the cleaning element 5, so that the filtered-out solids can simply be introduced into the collecting container 27. The rack elements 16 are moved in and out in the region of the lower deflecting device 4, too, so that the sealing-off element 29 (FIG. 1), which may also take the form of a brush, can come to bear sealingly on the screening surface 26. The lower deflecting device 4 may have a somewhat larger diameter than the upper deflecting device 3, so that, in the moved-in state, the rack elements 16 do not project above the screening surface 26, thus ensuring the best possible seal with regard to the sealing-off element 29 and the screening surface 26.

FIG. 2 also shows that the rack element 16 is of essentially L-shaped form, the bearing lugs 36 and 37 being formed on the leg 38 of the L. The base 39 of the L forms a rack prong 40 of the rack element 16. The contour of the base 39 is selected such that the formation of a gap relative to the bar-shaped connecting element 13 is avoided in any pivoting position of the rack element 16, so that solids cannot pass through the screening belt 2 here.

The revolving screening rack 1 is oriented preferably at an angle α relative to an imaginary horizontal line H, so that solids deposited on the rack 15 can be transported reliably to the collecting container 27. The angle a is preferably approximately 15°.

FIG. 3 reproduces a supporting frame 41 for the revolving screening rack 1. The supporting frame 41 comprises at least two subframes 42 and 43 which are displaceable relative to one another. The length or height of the supporting frame 41 is thus telescopically adjustable. For this purpose, in particular, there is provision for the supporting frame 41 to have a supporting strut 44, on which the second subframe 43 is fixedly mounted. The supporting strut 44 is designed in terms of its supporting capacity in such a way that it carries the remaining frame parts of the supporting frame 41 and also the components of the revolving screening rack 1. In particular, it is possible by the revolving screening rack 1 being arranged at an angle α, since the weight of the revolving screening rack and of the remaining frame parts of the supporting frame 41 can then be absorbed by the supporting strut 44. It is thereby possible to design the subframes 42 and 43 in a particularly simple way, since these are, at least, not the main component of the device supporting the weight.

For the telescopic extending movement of the supporting frame 41, the supporting strut 44 has a sliding device 45, on which the first subframe 42 rests displaceably. Clamping means 46 are provided for fixing the first subframe 42 relative to the second subframe 43. Additionally or alternatively, the displacement movement of the first subframe 42 relative to the second subframe 43 may be produced by means of an adjusting spindle 47. The adjusting spindle 47 may be formed by a threaded rod 48, on which an adjusting nut 49 is screwed. The length or height of the supporting frame 41 can be set with particular accuracy by means of the adjusting spindle 47. In particular, there is provision for the adjusting spindle 47 to serve for changing the distance between the upper deflecting device 3 and the lower deflecting device 4 (FIG. 1), with the result that the screening belt 2 can be tensioned between the two deflecting devices 3 and 4 in the manner of a link chain. The lower deflecting device 4 is mounted preferably on the second subframe 43. It is also possible, of course, to provide a separate, third subframe (not illustrated) which can be arranged between the first and the second subframe 42 and 43. Third subframes may be designed so as to be of variable respective length, so that the supporting frame 41 can be adapted to different conveying heights of the revolving screening rack 1.

FIG. 3 also shows that the upper deflecting device 3 takes the form of a chain wheel 50. A second chain wheel (not illustrated) is congruent with the chain wheel 50. The two chain wheels are at a distance from one another and can be coupled to one another via a shaft 51. The two chain wheels are at a distance from one another such that the edges of the screening belt 2 rest on them, so that the screening belt 2 can thereby be driven in the conveying direction.

The chain wheel 50 or the shaft 51 is assigned a drive 52 which may take the form of an electric motor and drives the upper deflecting device 3 at least in the direction of the arrow 11.

As already mentioned in connection with FIGS. 1 and 2, a cleaning element 5, which cooperates with the screening surface 26 of the screening belt 2, is arranged in the region of the upper deflecting device 3. The cleaning element 5 may be designed as a cleaning brush 25 which, if appropriate, may be set in rotation via the drive 52. The cleaning element 5 or the cleaning brush 25 is capable of being displaced, within a housing 53 covering at least the upper deflecting device 3, with respect to a discharge orifice 54 of the housing 53. The collecting container 27 described above may be located below the discharge orifice 54. Instead of the collecting container 27, devices for the treatment of the racked product may also be arranged, which may, for example, be a washing, pressing or conveying device for the racked product. These devices for treating the racked product may readily be fastened to the stable supporting strut 44.

FIG. 4 illustrates a preferred exemplary embodiment of a rack element 16, also designated as a rack hook element, of the revolving screening rack 1. The rack element 16 is of essentially L-shaped form, the base 39 forming the rack prong 40 and the leg 38 having the two bearing lugs 36 and 37. The two bearing lugs 36 and 37 are of open-edged design and therefore in each case have an edge orifice 55 and 56 respectively. As already mentioned, the bar-shaped connecting element 13 of two screening elements 12 passes through the first bearing lug 36. The first bearing lug 36 thus forms the pivot axis or a pivot point for the rack element 16. The second bearing lug 37 is connected to the steering lever 17, so that the drive of the rack element 16 can be coupled to a connecting piece in this second bearing lug 37.

The edge orifice 55 or the bearing lug 36 is oriented in such a way that the edge orifice 55 is located at the free end 57 of the leg 38. In other words, the edge orifice 55 of the first bearing lug 36 lies essentially in the direction of longitudinal extent of the leg 38 and so as to face away from the base 39. The edge orifice 56 of the second bearing lug 37 opens approximately at right angles to the leg 38 and is located on the same side as the leg 38, that is to say so as to face away from the rack prong 40.

The rack element 16 can be inserted through the edge orifice 55 into an already prefabricated or premounted screening belt 2. The rack element 16 can therefore be slipped in a simple way onto the bar-shaped connecting element 13. So that the rack element 16 cannot unintentionally slip off again from the connecting element 13, the edge orifice 55 is assigned a closing means 58 which closes the edge orifice 55. The closing means 58 is preferably adapted to the contour of the edge orifice 55. So that the closing means 58 can be held securely in the edge orifice 55, at least one face 59 delimiting the edge orifice 55, but preferably both faces 59 and 59', are provided with a latching device 60 which cooperates with a counterlatching device 61 on the closing means 58. In a preferred embodiment, the latching and counterlatching devices 60 and 61 are formed by a plurality of latching noses and latching depressions which allow sawtooth-like engagement between the closing means 58 and the rack element 16. With the closing means 58 inserted, the latching noses of the latching device 60 engage into the latching depressions of the counterlatching device and the latching noses of the counterlatching device 61 engage into the latching depressions of the latching device 60.

So that the rack element 16 can be slipped onto the connecting element 13, the edge orifice 55 has an opening width W (FIG. 5) which is approximately equal to the cross section or the diameter of the bar-shaped connecting element 13. The rack element 16 can consequently be slipped onto the connecting element 13 in a simple way.

The opening width X of the edge orifice 56 of the second bearing lug 37 is preferably somewhat smaller than the diameter of a connecting piece between the rack element 16 and the steering lever 17. A type of snap connection is consequently made, so that the rack element 16 can be driven reliably via the steering lever 17, but releasability is afforded. There may also be provision for closing the edge orifice 56 by a closing means, such as has already been described in connection with the edge orifice 55. The rack element 16 is therefore distinguished in that it can be inserted into a prefabricated screening belt 2, that is to say the screening belt 2 may even take the form of an endless or closed screening belt in which individual screening elements 12 are already connected to one another by means of the bar-shaped connecting elements 13. It is thereby possible in an advantageous way to exchange a damaged rack element 16, without having to dismantle the screening belt 2 in any way. The ease with which the revolving screening rack 1 is maintained is consequently increased considerably.

Furthermore, a plurality of rack hook elements 16 of a rack 15 or of a row of rack hook elements are capable of being connected to one another by means of a rigid connection in their respective second bearing lug 56. Only one rack element 16 is therefore driven via the steering lever. The remaining nondriven rack hook elements 16 are thus positively guided, with the result that a synchronization of the movement of the rack hook elements 16 of a rack 15 or of a row of rack hook elements is ensured.

The fact that the rack element 16 is of essentially L-shaped form means that the leg 38 forms an angle β, which is smaller than 90°, relative to an imaginary line G running along the base 39. The length of the leg 38 is preferably dimensioned in such a way that an imaginary perpendicular N standing approximately centrally on the line G intersects the leg end 57 or the first bearing lug 36.

FIG. 6A shows the plate or control shackle 14' of a screening element 12. A bar-shaped connecting element 13 passes in each case through the bearing lugs 32 and 33, so that the plate 14' is capable of being connected pivotally movably to the preceding and following plate of the corresponding screening element 12, as seen in the conveying direction 9. The control shackle 14' has a prolongation 62 which extends essentially transversely to the longitudinal extent of the control shackle 14'. Provided at the end 63 of the prolongation 62 is the third bearing lug 35, on or in which the steering lever 17 is articulated pivotally movably. The control shackle 14' is in essentially triangular form. According to a second exemplary embodiment, it is, of course, also possible for the control shackle 14' to have an L-shaped design, the prolongation 62 being formed by a short leg S of the L, as shown in FIG. 6B. Since the third bearing lug 35 is displaced out of the region of the plates 14 of the screening belt 2, the steering lever 17 can be released from the screening belt 2 in a simple way. This is advantageous particularly when a damaged steering lever 17 is exchanged. FIG. 6C illustrates a third exemplary embodiment of a control shackle 14' which is of essentially T-shaped form. The T-shaped control shackle possesses a transverse web Q and a horizontal web H1 which emanates approximately at right angles from the transverse web Q. The horizontal web H1 forms the prolongation 62. Identical parts or identically acting parts are given the same reference symbols in FIGS. 6A, 6B and 6C.

FIGS. 7A and 7B show respectively a side view and a top view of a detail of an exemplary embodiment of a screening belt 2. The individual screening elements 12 are pivotably connected to one another by means of bar-shaped connecting elements 12. A screening element 12' is assigned at least one rack element 16. The steering lever 17 is, on one side, pivotably fastened to the rack element 16 via a connecting piece 64. The connecting piece 64 engages through the second bearing lug 37 of the rack element 16 and the first end 19 of the steering lever 17. The latter is held, at its other end 20, pivotally movably between two plates 14' (control shackles) by means of a further connecting piece 64', the connecting piece 64' engaging through the third bearing lug 35 of the rack element 16. It is also possible, of course, for the pivoting lever 17 to be articulated pivotally movably on one plate 14' only. It is also possible for the connecting piece 64 to have a bar-shaped design, so that the rack elements 16 of a row of rack elements are connected rigidly to one another, in order to synchronize the move-in and move-out movement of the rack elements.

Spacer means 65 are arranged in each case between two plates 14 in the edge region of the screening belt 2, so that there is the possibility of engagement for the chain wheel 50. The outer edge region of the screening belt 2 thus forms the driving chain. It is possible, of course, for both side edges of the screening belt 2 to be provided as a driving chain.

The gap between two plates 14 or 14' of a screening element 12 is set, here, by means of the thickness of the plate 14 or 14' of the preceding or following screening element. It is also possible, of course, to enlarge the gap between two plates 14 by the fitting of spacer means. In a preferred embodiment, a screening element 12 has a plurality of rack elements 16, there being located between two adjacent rack elements two plates 14 of a screening element between which there is no rack element provided. Preferably, therefore, every second gap between two plates 14 is assigned a rack element 16. However, the number of rack elements 16 for each screening element may be modified. Furthermore, it is possible for the rack elements 16 of two screening elements 12 or 12' to be arranged so as to be offset in relation to one another, as seen in the conveying direction 9.

The move-in and move-out movement during a rotation of the screening belt around a deflecting device is described in more detail with reference to FIG. 8. The moving in and moving out or the distance covered during the moving-in and moving-out operation depends on the radius r of the upper deflecting device 3 which is merely indicated here. When the screening belt 2, of which only the path of movement B is indicated here, is moved in the conveying direction 9, since the bearing point 37' in the bearing lug 37 does not lie on a connecting line V which connects the bearing point 35' in the bearing lug 35 to the bearing point 33' in the bearing lug 33, a torque is generated about the bearing point 33' in the direction of the arrow 18', with the result that the rack hook element 16 is moved virtually into the screening belt 2. This moving-in of the rack element 16 takes place continuously until, after rotation about the deflecting device 3, the bearing point 33' again lies on a straight section of the path of movement B. The moving-out of the rack hook 16 then commences. The rack element 16 is therefore moved about its bearing point 33' in the direction of the arrow 18", as a result of which the rack element 16 has been brought into the moved-out position again. The fully moved-out position or maximum moved-out position is reached when the bearing points 32' and 33' again lie on the straight section of the path of movement B, as reproduced in FIG. 8 by the rack hook element 16 running off from the deflecting device 3.

Since the bearing points 33', 35' and 37' do not lie together on the imaginary connecting line V in any position of the rack element 16, but, instead, the bearing point 37' lies outside the screening belt in the region 22, as soon as the rack element 16 enters the region of a deflecting device 3 or 4 the situation where the rack element 16 would be moved out stead of moved in is prevented. Thus, during the movement the rack element 16, the bearing point 37' is not spaced to such an extent such that it coincides with a ad center T. This ensures a reliable control or reliable drive of the rack element 16.

What is claimed is:

1. A revolving screening rack (1) which comprises a driveable endless screening belt (2) formed by a plurality of screening elements (12) which in each case have a plurality of elongate plates (14) arranged parallel to and at a distance from one another, a bar-shaped connecting element (13) engaging in each case through the plates (14) at their two ends, said connecting element pivotably connecting the plates (14), engaging one into the other at least in regions, of two screening elements (12) to one another in the manner of a link chain, said screening belt further includes a pivotably mounted rack hook element (16) which is capable of being pivotably displaced, at least partially, through between two plates (14) located next to one another, and with a steering lever (17) for the rack hook element (16), said steering lever being pivotably articulated at one end (19) on the rack hook element, wherein the other end (20) of the steering lever (17) is pivotably mounted on the screening belt (2).

2. The revolving screening rack as claimed in claim 1, wherein the steering lever (17) is fastened so as to be pivotably mounted at its other end (20) on a screening element (12) of the screening belt (2), said screening element following, as seen in the conveying direction (9) of the screening belt (2), the screening element (12) which has a rack hook element (16).

3. The revolving screening rack as claimed in claim 1, wherein the bar-shaped connecting element (13) engages through the other end (20) of the steering lever (17).

4. The revolving screening rack as claimed in claim 1, wherein at least one plate of the screening element (12), on which plate the screening lever (17) is mounted, is of essentially triangular form as a control shackle (14'), a bar-shaped connecting element (13) engaging in each case through two corner regions (30, 31), and the steering lever (17) being arranged so as to be pivotably mounted on the third corner region (34).

5. The revolving screening rack as claimed in claim 1, wherein at least one plate of the screening element (12), on which plate the steering lever (17) is mounted, is of essentially T-shaped form as a control shackle (14'), a bar-shaped connecting element (13) engaging in each case through the ends of the transverse web (Q) of the T, and the steering lever (17) being arranged so as to be pivotably mounted on the free end of the horizontal web (H1) of the T.

6. The revolving screening rack as claimed in claim 1, wherein at least one plate (14) of the screening element (12), on which plate the steering lever (17) is mounted, is of essentially L-shaped form as a control shackle (14'), a bar-shaped connecting element (13) engaging in each case through the ends of the long leg of the L, and the steering lever (17) being arranged so as to be pivotably mounted on the free end of the short leg (S) of the L.

7. The revolving screening rack as claimed in claim 4, wherein the control shackle (14') has a third bearing lug (35) which is formed on a prolongation (62) of the triangle, of the T or L, the prolongation (62) extending transversely to the longitudinal extent of the control shackle (14').

8. The revolving screening rack as claimed in claim 1, wherein the rack hook element (16) is pivotably mounted on the connecting element (13).

9. The revolving screening rack as claimed in claim 1, wherein the rack hook element (16) is of essentially L-shaped form, wherein the rack hook element (16) is pivotably mounted on the free leg end (57) of the L between the two plates (14) of a screening element (12), and wherein the rack hook element (16) forms a rack prong (40) with the base (39) of the L.

10. The revolving screening rack as claimed in claim 9, wherein the steering lever (17) is pivotably articulated in the transitional region between the leg (38) and the base (39) of the L.

11. The revolving screening rack as claimed in claim 1, wherein the rack hook element (16) has a first bearing lug (36), through which the bar-shaped connecting element (13) passes.

12. The revolving screening rack as claimed in claim 11, wherein the rack hook element (16) has a second bearing lug (37), so that the rack hook element (16) can be fastened pivotably movably to the steering lever (17) by means of a connecting piece (64).

13. The revolving screening rack as claimed in claim 12, wherein the two bearing lugs (36, 37) each have an edge orifice (55, 56).

14. The revolving screening rack as claimed in claim 13, wherein the opening width (X) of the edge orifice (56) of the second bearing lug (37) is somewhat smaller than the cross section of the connecting piece (64).

15. The revolving screening rack as claimed in claim 11, wherein the first bearing lug (36) has an opening width (W) which is approximately equal to, the diameter of the bar-shaped connecting element (13).

16. The revolving screening rack as claimed in claim 13, wherein the first bearing lug (36) is capable of being closed in the region of its edge orifice (55) by a closing means (58) which is optionally adapted to the contour of the edge orifice (55).

17. The revolving screening, rack as claimed in claim 16, wherein at least one surface (59; 59'), delimiting the edge orifice (55), of the first bearing lug (55) has a latching device (60) which cooperates with a counterlatching device (61) on the closing means (58).

18. The revolving screening rack as claimed in claim 17, wherein the latching and counterlatching devices are formed in each case by a plurality of latching noses and latching depressions.

19. The revolving screening rack as claimed in claim 1, wherein a plurality of rack hook elements (16) are provided, one of which is in each case arranged between two plates (14) of a screening element (12), so that a row (15) of rack hook elements with a plurality of rack prongs (40) is produced.

20. The revolving screening rack as claimed in claim 1, wherein a plurality of screening elements (12) of the screening belt (2) in each case have a row (15) of rack hook elements, and wherein a bar-shaped connecting element (13) engages through the rack hook elements (16) of a row (15) of rack hook elements and forms the pivot shaft of the row (15) of rack hook elements.

21. The revolving screening rack as claimed in claim 1, wherein the rack hook elements (16) of a row (15) of rack hook elements are rigidly connected to one another for synchronizing their movement, the rigid connection being formed by the connecting piece (64) which is of bar-shaped design.

22. The revolving screening rack as claimed in claim 21, wherein the rack hook element (16) is of essentially L-shaped form and wherein; the rigid connection is provided in the transitional regions between the legs (38) and the bases (39) of the L-shaped rack hook elements (16).

23. The revolving screening rack as claimed in claim 22, wherein the leg (38) forms an angle ($\beta$) smaller than 90° with the base (39), and wherein the length of the leg (38) is dimensioned in such a way that an imaginary perpendicular (N) standing approximately centrally on the base (39) or on an imaginary line (G) intersects the leg end (57) of the L.

24. The revolving screening rack as claimed in claim 13, wherein the edge orifice (55) of the first bearing lug (36) opens essentially in the direction of longitudinal extent of the leg (38) and so as to face away from the base (39), and wherein the edge orifice (56) of the second bearing lug (37) is arranged approximately at right angles to the leg (38) and is located on the leg (38).

25. The revolving screening rack as claimed in claim 1, wherein the screening belt (2) is guided on a first and a second deflecting device (3, 4) which are arranged on a telescopically extendable supporting frame (41) which is capable of being fixed in its respective extended position.

26. The revolving screening rack as claimed in claim 25, wherein the supporting frame (41) is composed of at least a first and second subframe (42, 43) which are displaceably connected to one another.

27. The revolving screening rack as claimed in claim 26, wherein a third subframe is provided, which is capable of being arranged between the first and the second subframe (42, 43), at least the first subframe (42) being displaceably connected to the third subframe.

* * * * *